United States Patent
Liou et al.

(10) Patent No.: US 11,044,026 B1
(45) Date of Patent: Jun. 22, 2021

(54) SYSTEM AND METHOD OF EMULATING RADIO DEVICE

(71) Applicant: NATIONAL CHIAO TUNG UNIVERSITY, Hsinchu (TW)

(72) Inventors: En-Cheng Liou, Hsinchu (TW); Ta-Sung Lee, Hsinchu (TW); Yi-Wei Chen, Hsinchu (TW); Kai-Ten Feng, Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/916,089

(22) Filed: Jun. 29, 2020

(30) Foreign Application Priority Data

Feb. 24, 2020 (TW) .................................. 109105903

(51) Int. Cl.
    *H04B 17/00* (2015.01)
    *H04B 17/24* (2015.01)

(52) U.S. Cl.
    CPC .................................. *H04B 17/24* (2015.01)

(58) Field of Classification Search
    CPC ...... H04B 17/0085; H04B 17/29; H04B 1/38; H04B 5/0031; H04B 7/0608; H04W 24/06; H01Q 3/267
    See application file for complete search history.

(56) References Cited

U.S. PATENT DOCUMENTS

| 10,237,098 B2 | 3/2019 | Kossel |
| 10,244,392 B2 | 3/2019 | Caracas et al. |
| 10,256,930 B2 | 4/2019 | Karajani et al. |
| 10,356,597 B2 | 7/2019 | Prasad et al. |
| 2011/0201336 A1* | 8/2011 | Garrett .............. H04W 36/0066 455/436 |
| 2011/0256863 A1* | 10/2011 | Ramasamy ........... H04W 24/08 455/424 |
| 2017/0195357 A1* | 7/2017 | Sundhar .............. H04W 12/125 |
| 2019/0059107 A1 | 2/2019 | Inoki et al. |
| 2019/0250242 A1 | 8/2019 | Lawitzky |

FOREIGN PATENT DOCUMENTS

| CN | 100472988 C | 3/2009 |
| CN | 102665229 B | 12/2014 |
| TW | I345162 B | 7/2011 |
| TW | I551068 B | 9/2016 |
| TW | I578727 B | 4/2017 |

* cited by examiner

*Primary Examiner* — Nhan T Le
(74) *Attorney, Agent, or Firm* — CKC & Partners Co., LLC

(57) ABSTRACT

A system and method of emulating radio device includes a multi-radio unit, a multi-radio unit controller and an under-test radio system. The multi-radio unit includes multiple radio circuits, in which the radio circuits are configured to generate multiple radio emulated signals. The multi-radio unit controller coupled to the multi-radio unit is configured to generate multiple control signals to the multi-radio unit, in which the control signals are configured to control the radio emulated signals sent by the multi-radio unit. The under-test radio system is configured to receive the radio emulated signals generated by the multi-radio unit, and configured to generate multiple data corresponding to the radio emulated signals.

12 Claims, 4 Drawing Sheets

100

100

SYSTEM AND METHOD OF EMULATING RADIO DEVICE

RELATED APPLICATION

The present application claims priority to Taiwan Application Serial Number 109105903, filed Feb. 24, 2020, which is incorporated herein by reference in its entirety.

BACKGROUND

Technical Field

The present disclosure relates to a system and method of emulating radio device. More particularly, the present disclosure relates to a system and method of emulating radio device including a multi-radio unit controller.

Description of Related Art

The present testing equipment for the mobile network mostly focuses on testing single functionality of the network, so the testing equipment is hard to be integrated. Therefore, the cost for the mobile network-testing is hard to be reduced.

The present disclosure provides a software testing system for the mobile communication industry. By controlling and simulating a large amount of control plane signals and data plane signals centrally, the cost of the testing equipment can be reduced, such that the research, development and testing for the related industry could be more efficient.

SUMMARY

In order to solve the problem mentioned above, one aspect of the present disclosure is to provide a system of emulating radio device comprising a multi-radio unit, a multi-radio unit controller and a under-test radio system. The multi-radio unit includes a plurality of radio circuits, wherein the plurality of radio circuits are configured to generate a plurality of radio emulated signals. The multi-radio unit controller is coupled to the multi-radio unit and configured to generate a plurality of control signals to the multi-radio unit, wherein the plurality of control signals are configured to control the plurality of radio emulated signals sent by the multi-radio unit. The under-test radio system is configured to receive the radio emulated signal generated by the multi-radio unit, to generate a plurality of data corresponding to the radio emulated signals, and configured to transmit the plurality of data to the multi-radio unit.

Some aspects of the present disclosure provide a method of emulating radio device, adapted for a system of emulating radio device, wherein the system comprises a multi-radio unit, including a plurality of radio circuits, a multi-radio unit controller and a under-test radio system, and the method comprises: controlling, by the multi-radio unit controller, the multi-radio unit to generate a plurality of radio emulated signals; transmitting, the plurality of radio emulated signals to the under-test radio system; generating, by the under-test radio system, a plurality of data in response of the plurality of radio emulated signals; and transmitting, via the at least one port, the plurality of data to the multi-radio unit controller to store the plurality of data.

By using the system and method of emulating radio device described above to simulate a large amount of signal channels, the cost of the testing equipment can be effectively reduced.

DETAILED DESCRIPTION

All the terms used in this document generally have their ordinary meanings. The examples of using any terms discussed herein such as those defined in commonly used dictionaries are illustrative only, and should not limit the scope and meaning of the disclosure. Likewise, the present disclosure is not limited to some embodiments given in this document.

The term "coupled" or "connected" in this document may be used to indicate that two or more elements physically or electrically contact with each other, directly or indirectly. They may also be used to indicate that two or more elements cooperate or interact with each other.

Figure 1:
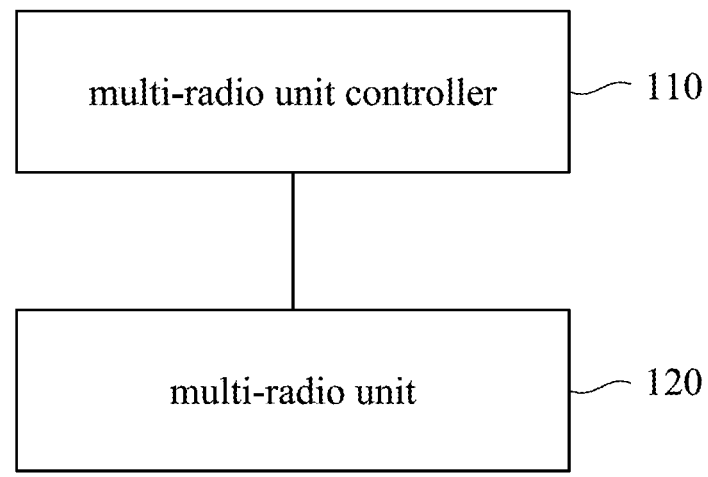
FIG. 1 is a schematic diagram of system of emulating radio device, in accordance with some embodiments of the present disclosure.
Figure 1:
Figure 1:
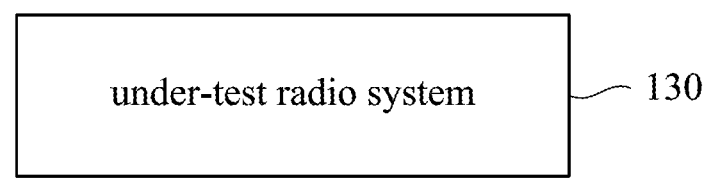

FIG. 1 is a schematic diagram of a system 100 of emulating radio device, in accordance with some embodiments of the present disclosure. The system 100 of emulating radio device includes a multi-radio unit controller 110, a multi-radio unit 120 and a under-test radio system 130. The multi-radio unit controller 110 couples to the multi-radio unit 120 with wires, for example, the multi-radio unit controller 110 can connect the multi-radio unit 120 through an Ethernet cable. The under-test radio system 130 then conducts data transmission with the multi-radio unit 120 by wireless communication, and a distance, an orientation and an angle between the under-test radio system 130 and the multi-radio unit 120 can be adjusted.

In some embodiments, the multi-radio unit 120 comprises multiple user devices including a smart phone, a software-defined radio, NetFPGA and AIOT, or any other devices that can work in a wireless environment or combination of radio circuits.

In some embodiments, the under-test radio system 130 comprises a base station, a virtual base station, a satellite base station, RRU/RRH or any other interface connecting devices that can work in a wireless environment.

In some embodiments, the multi-radio unit controller 110 is configured to generate multiple control signals CS to the multi-radio unit 120, and the multi-radio unit 120 generates multiple corresponding radio emulated signals in response of the control signals CS.

In some embodiments, the under-test radio system 130 receives the radio emulated signals generated by the multi-radio unit 120, and generates multiple corresponding data TD in response of the radio emulated signals mentioned above. The under-test radio system 130 then sends the data TD back to the multi-radio unit 120.

Following by the above description, by transmitting the control signals CS to the multi-radio unit 120, the multi-radio unit controller 110 controls the radio emulated signals sent by the multi-radio unit 120. In some embodiments, the multi-radio unit controller 110 controls the multi-radio unit 120 to generate a radio emulated signal, e.g., a control plane standard connection signal, according to multiple control plane parameters, and to send the control plane standard connection signal to the under-test radio system 130, so as to build a connection conformed to a standard connection protocol; or the multi-radio unit controller 110 controls the multi-radio unit 120 to generate a control plane customized connection signal according to the adjusted control plane parameters, and to send the control plane customized connection signal to the under-test radio system 130, so as to build a connection not conformed to the standard connection protocol.

In some embodiments, the connection conformed to the standard connection protocol mentioned above means that the connection conformed to 3GPP ($3^{rd}$ generation partnership project) wireless communication standard protocol.

In some embodiments, the control plane parameters mentioned above include version of the connection or identifying data for a user device, e.g., numbers of a smart phone SIM (Subscriber identity module) card. For example, when the multi-radio unit controller 110 controls the multi-radio unit 120 to send a connection signal conformed to the 3GPP wireless communication standard protocol, the under-test radio system 130 verifies that the version of the connection or the numbers of the user device is correct, and sets up the connection. But if the multi-radio unit controller 110 controls the multi-radio unit 120 to send a connection signal not conformed to the 3GPP wireless communication standard protocol, e.g., wrong version of the connection, or the numbers of the user device or packet header is not correct, the under-test radio system 130 then conducts the connection not conformed to the standard connection protocol.

In some other embodiments, the multi-radio unit controller 110 controls the multi-radio unit 120 to generate a data plane specified category signal, in which the under-test radio system 130 sends data plane information, corresponding to the data plane specified category signal, to the multi-radio unit 120 via the connection conformed to the standard connection protocol; or the multi-radio unit controller 110 controls the multi-radio unit 120 to generate a data plane customized category signal, in which the under-test radio system 130 sends data plane information, corresponding to the data plane customized category signal, to the multi-radio unit 120 via the connection not conformed to the standard connection protocol. In some embodiments, the data plane information mentioned above includes texts, voices, videos and pictures data.

Figure 2:
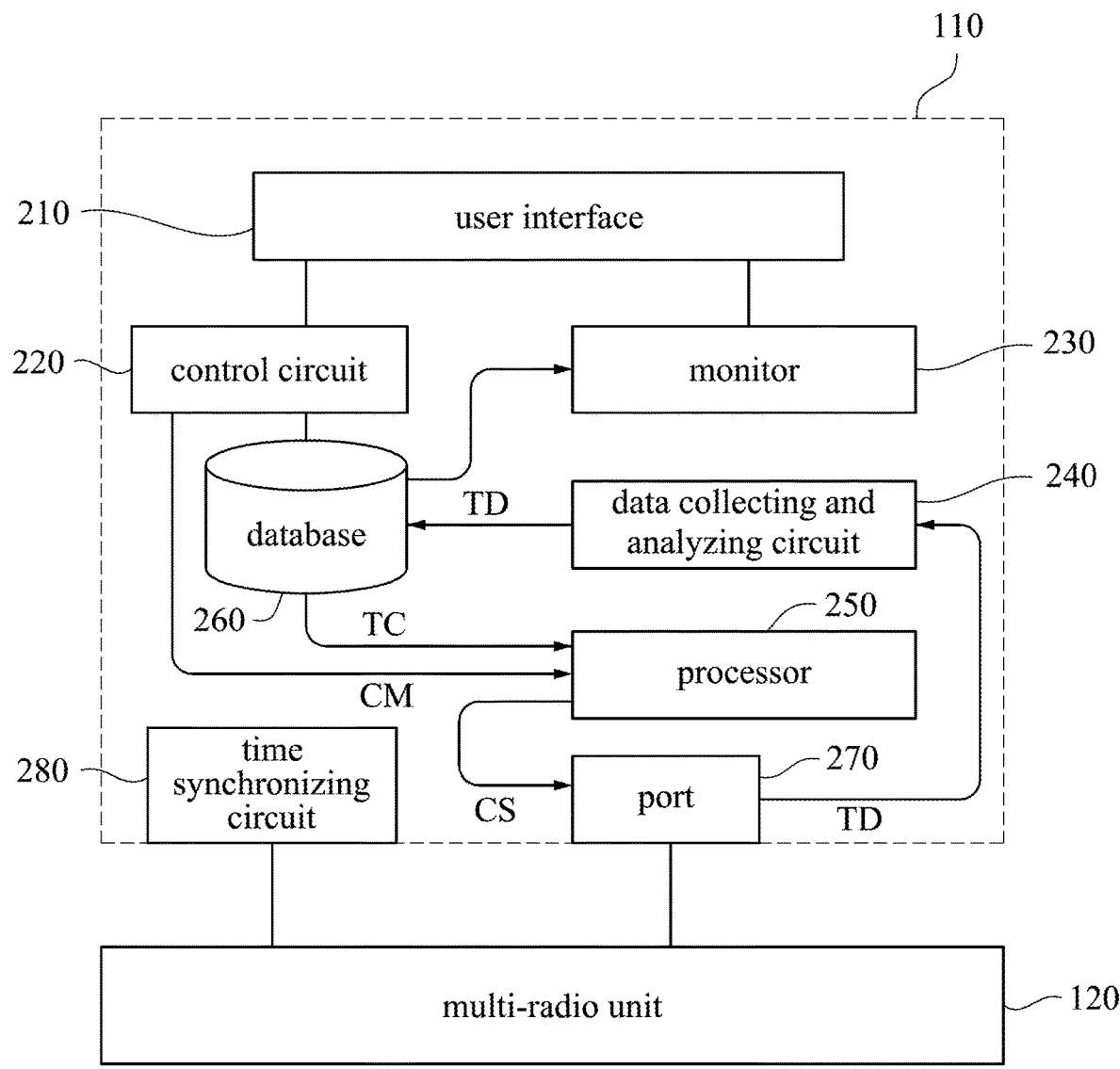
FIG. 2 is a schematic diagram of multi-unit controller in FIG. 1, in accordance with some embodiments of the present disclosure.

FIG. 2 is a schematic diagram of multi-unit controller 110 in FIG. 1, in accordance with some embodiments of the present disclosure. The multi-unit controller 110 includes a user interface 210, a control circuit 220, a monitor 230, a data collecting and analyzing circuit 240, a processor 250, a database 260, at least one port 270 and a time synchronizing circuit 280. In some embodiments, the time synchronizing circuit 280 is coupled to the multi-radio unit 120, and at least one port 270 is coupled to the multi-radio unit 120.

Figure 3:
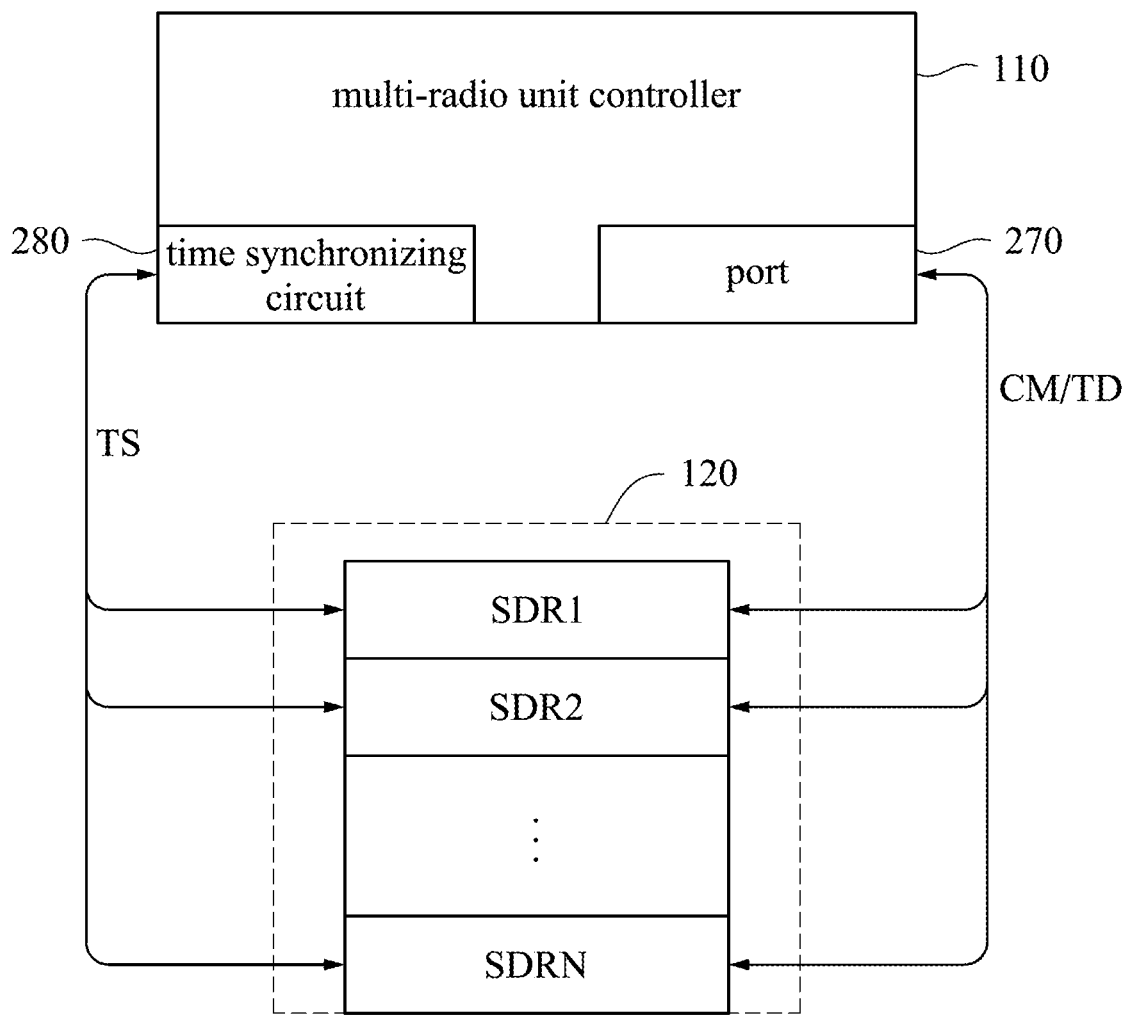
FIG. 3 is a schematic diagram of multi-unit in FIG. 1, in accordance with some embodiments of the present disclosure.

In some embodiments, the multi-radio unit 120 includes multiple radio circuits SDR1~SDRN. As shown in FIG. 3, FIG. 3 is a schematic diagram of multi-unit 120 in FIG. 1, in accordance with some embodiments of the present disclosure. The radio circuits SDR1~SDRN generate corresponding radio emulated signals in response of the control signals generated by the control signals CS.

In some embodiments, the radio circuits SDR1~SDRN include multiple software defined radios or hardware defined radios. Each of the radio circuits SDR1~SDRN includes a CPU, a system memory such as static random access memory (SRAM), dynamic random access memory (DRAM) or read-only memory (ROM), a mass storage device such as a hard disk drive, or a magnetic disk drive, a mother board and radio antennas.

In some embodiments, the time synchronizing circuit 280 is configured to generate multiple synchronizing signals TS to the radio circuits SDR1~SDRN of the multi-radio unit 120. The system 100 of emulating radio device synchronizes time between the multi-unit controller 110 and the multi-radio unit 120 by the synchronizing signals TS. In some embodiments, the time synchronizing circuit 280 can be realized by a GPS module.

In some embodiments, the database 260 store multiple testing instructions TC and the data TD generated by the under-test radio system 130 in response of the radio emulated signals.

In some embodiments, the control circuit 220, the processor 250 and the database 260 are coupled to each other in order to operate cooperatively. For example, the control circuit 220 is configured to generate multiple control instructions CM and send the control instructions CM to the processor 250. The control circuit 220 is also configured to access the testing instructions TC from the database 260, and send at least one of the testing instructions TC to the processor 250 via the database 260. The processor 250 is configured to execute the control instructions CM and the at least one of the testing instructions TC to generate the corresponding control signals CS.

In some embodiments, the control signals CS are sent to the radio circuits SDR1~SDRN of the multi-radio unit 120, respectively, via the at least one port to generate the radio emulated signals corresponding to the control signals CS.

In some embodiments, the control signals CS control at least one of the followings including emission time, receiving time, frequency and intensity of the radio emulated signals.

In some embodiments, the data collecting and analyzing circuit 240 coupled to the database 260 and the at least one port 270 is configured to store the data TD, generated by the under-test radio system 130 in response of the radio emulated signals, to the database 260.

In some embodiments, the multi-unit controller 110 can be realized by a x86 server platform, in which the x86 server platform comprises a CPU, a system memory such as static random access memory (SRAM), dynamic random access memory (DRAM) or read-only memory (ROM), a mass storage device such as a hard disk drive, or a magnetic disk drive, and a mother board.

Figure 4:
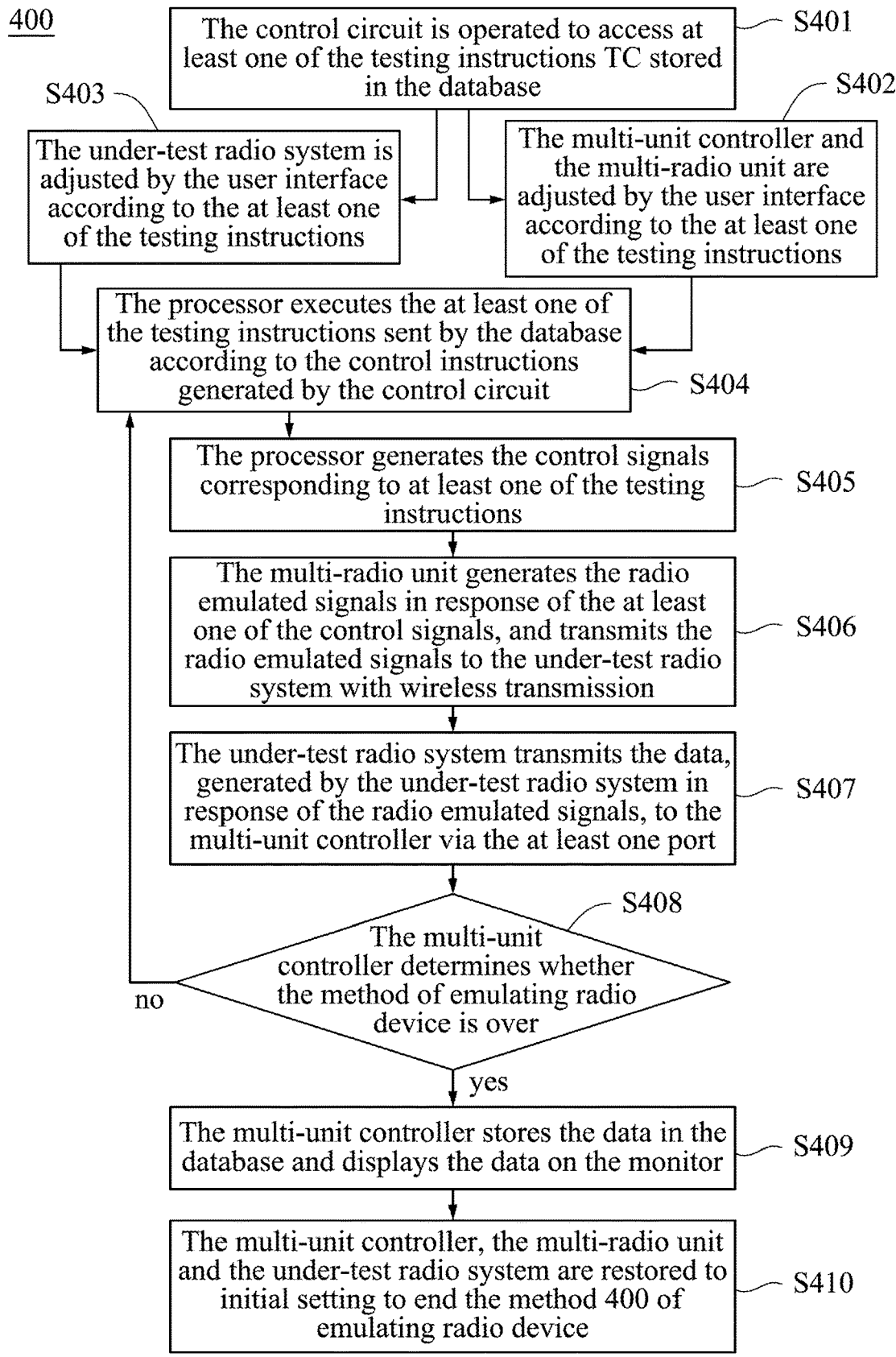
FIG. 4 is a flowchart of method of emulating radio device, in accordance with some embodiments of the present disclosure.

FIG. 4 is a flowchart of method 400 of emulating radio device, in accordance with some embodiments of the present disclosure. As shown in FIG. 4, the method 400 of emulating radio device comprises steps S401, S402, S403, S404, S405, S406, S407, S408 and S409. For the purpose of convenient illustration, the method 400 of emulating radio device shown in FIG. 4 is illustrated by referencing to, but not limiting to, the FIG. 2.

Reference is now made to FIG. 2. In step S401, the control circuit 220 is operated to access at least one of the testing instructions TC stored in the database 260. In step S402, the multi-unit controller 110 and the multi-radio unit 120 are adjusted by the user interface 210 according to the at least one of the testing instructions TC. For example, performing step S402 includes synchronizing time between the multi-unit controller 110 and the multi-radio unit 120. In some embodiments, the control circuit 220 can access multiple testing instructions TC at the same time, then sends the testing instructions TC to the processor 250 via the database 260.

Following step S402, in step S403, the under-test radio system 130 is adjusted by the user interface 210 according to the at least one of the testing instructions TC. In step S404, the processor 250 executes the at least one of the testing instructions TC sent by the database 260 according to the control instructions CM generated by the control circuit 220. For example, performing step S403 includes adjusting any one of the followings, such as distance, direction and orientation between the multi-radio unit 120 and the under-test radio system 130. Alternatively stated, by performing step S403, the corresponding distance, direction or orientation of the radio emulated signals received by the under-test radio system 130 can be adjusted.

As mentioned above, in some embodiments, distance or angle between the multi-radio unit 120 and the under-test radio system 130 can be adjusted by the user interface 210 to measure intensity of the corresponding radio emulated signals at different locations.

Following step S404, in step S405, the processor 250 generates the control signals CS corresponding to at least one of the testing instructions TC. At least one of the control signals CS is sent to the radio circuits SDR1~SDRN of the multi-radio unit 120 via the at least one port 270. In step S406, the multi-radio unit 120 generates the radio emulated signals in response of the at least one of the control signals CS, and transmits the radio emulated signals to the under-test radio system 130 with wireless transmission. In step S407, the under-test radio system 130 transmits the data TD, generated by the under-test radio system 130 in response of the radio emulated signals, to the multi-unit controller 110 via the at least one port 270.

In some other embodiments, the radio emulated signals, identified by the under-test radio system 130, can be generated by the same one of the radio circuits SDR1~SDRN, to simulate moving behavior of a radio device.

Following step S407, in step S408, the multi-unit controller 110 determines whether the method 400 of emulating radio device is over. If the method 400 is over, the multi-unit controller 110 stores the data TD in the database 260 and displays the data TD on the monitor 230 in step S409. In step S410, the multi-unit controller 110, the multi-radio unit 120 and the under-test radio system 130 are restored to initial setting to end the method 400 of emulating radio device. If the method 400 is not over, the operation returns to the step S404.

In some embodiments, the data TD is processed by the data collecting and analyzing circuit 240 and then displayed by the monitor 230. For example, the data collecting and analyzing circuit 240 stores latency between each of the radio emulated signals, generated by different radio circuits and sent back from the under-test radio system 130, in the database 260. The latency between each of the radio emulated signals then is displayed on the monitor 230.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A system of emulating radio device comprising:
a multi-radio unit including a plurality of radio circuits, wherein the plurality of radio circuits are configured to generate a plurality of radio emulated signals;
a multi-radio unit controller coupled to the multi-radio unit and configured to generate a plurality of control signals to the multi-radio unit, wherein the plurality of control signals are configured to control the plurality of radio emulated signals sent by the multi-radio unit; and
an under-test radio system configured to receive the radio emulated signal generated by the multi-radio unit, to generate a plurality of data corresponding to the radio emulated signals, and configured to transmit the plurality of data to the multi-radio unit,
wherein the plurality of control signals are configured to control the multi-radio unit to: generate a control plane standard connection signal according to a plurality of control plane parameters, and send the control plane standard connection signal to the under-test radio system, so as to build a connection conformed to a standard connection protocol; generate a control plane customized connection signal according to the plurality of adjusted control plane parameters, and send the control plane customized connection signal to the under-test radio system, so as to build a connection not conformed to the standard connection protocol; generate a data plane specified category signal, wherein the under-test radio system sends data plane information, corresponding to the data plane specified category signal, to the multi-radio unit via the connection conformed to the standard connection protocol; and generate a data plane customized category signal, wherein the under-test radio system sends data plane information, corresponding to the data plane customized category signal, to the multi-radio unit via the connection not conformed to the standard connection protocol.

2. The system of emulating radio device of claim 1, wherein the multi-radio unit controller comprises:
a database configured to store a plurality of testing instructions and the plurality of data generated by the under-test radio system in response of the plurality of radio emulated signals;
a control circuit configured to generate a plurality of control instructions;
a processor configured to execute the plurality of control instructions and the plurality of testing instructions to generate the plurality of corresponding control signals, wherein at least one of the plurality of testing instructions accessed by the control circuit are sent to the processor via the database; and
at least one port coupled to the processor and the multi-radio unit and configured to send the plurality of control signals to the plurality of radio circuits respectively, so as to generate the plurality of radio emulated signals corresponding to the plurality of control signals.

3. The system of emulating radio device of claim 1, wherein the multi-radio unit controller further comprises:
a time synchronizing circuit coupled to the multi-radio unit and configured to generate a plurality of time synchronizing signals, wherein the plurality of time synchronizing signals are used for synchronizing time between each of the plurality of radio circuits and the multi-radio unit controller; and
a data collecting and analyzing circuit coupled to the database and the at least one port, and configured to store the plurality of data in the database, wherein the plurality of data is generated by the under-test radio system in response of the plurality of radio emulated signals.

4. The system of emulating radio device of claim 1, wherein the plurality of radio circuits comprise a plurality of software defined radios or hardware defined radios.

5. The system of emulating radio device of claim 1, wherein the plurality of control signals control at least one of the followings including emission time, receiving time, frequency and intensity of the plurality of radio emulated signals.

6. The system of emulating radio device of claim 2, wherein the under-test radio system is configured to receive the plurality of radio emulated signals corresponding to any different distance, orientation and angle.

7. The system of emulating radio device of claim 1, wherein the multi-radio unit comprises a smart phone, a software-defined radio, NetFPGA or AIOT.

8. The system of emulating radio device of claim 1, wherein the under-test radio system comprises a base station, virtual base station, satellite base station or RRU/RRH.

9. A method of emulating radio device, adapted for a system of emulating radio device, wherein the system comprises a multi-radio unit, including a plurality of radio circuits, a multi-radio unit controller and a under-test radio system, and the method comprises:
controlling, by the multi-radio unit controller, the multi-radio unit to generate a plurality of radio emulated signals;
transmitting, the plurality of radio emulated signals to the under-test radio system;
generating, by the under-test radio system, a plurality of data in response of the plurality of radio emulated signals; and
transmitting, via the at least one port, the plurality of data to the multi-radio unit controller to store the plurality of data,
wherein the multi-radio unit controller controlling the multi-radio unit comprises: accessing at least one of a plurality of testing instructions from a database of the multi-radio unit controller; adjusting the multi-radio unit controller and the multi-radio unit according to at least one of the plurality of testing instructions accessed by the multi-radio unit controller; adjusting the under-test radio system according to at least one of the plurality of testing instructions accessed by the multi-radio unit controller; executing at least one of the plurality of testing instructions to generate a plurality of control signals corresponding to the at least one of the plurality of testing instructions; and transmitting at least one of the plurality of control signals to the plurality of radio circuits of the multi-radio unit via the at least one port, so as to generate the plurality of radio emulated signals.

10. The method of emulating radio device of claim 9, wherein the under-test radio system generating the plurality of data comprises:
identifying, by the under-test radio system, the plurality of radio emulated signals generated by a same radio circuit of the plurality of radio circuits; and
generating, by the under-test radio system, the plurality of data corresponding to the plurality of identified radio emulated signals.

11. The method of emulating radio device of claim 9, wherein adjusting the under-test radio system according to at least one of the plurality of testing instructions comprises:
adjusting any of the followings, including the corresponding distance, direction and orientation of the plurality of radio emulated signals received by the under-test radio system.

12. The method of emulating radio device of claim 9, wherein adjusting the multi-radio unit controller and the multi-radio unit according to at least one of the plurality of selected testing instructions comprises:
synchronizing time between the multi-radio unit and the multi-radio unit controller.

* * * * *